United States Patent [19]

Vanzee et al.

[11] Patent Number: 5,062,734
[45] Date of Patent: Nov. 5, 1991

[54] SHAFT COUPLING DEVICE

[76] Inventors: David G. Vanzee; Douglas A. Ostlind, both of Rte. 3, Box 875, Rd. 97, Woodland, Calif. 95695

[21] Appl. No.: 610,741

[22] Filed: Nov. 8, 1990

[51] Int. Cl.⁵ ............................................. F16B 2/02
[52] U.S. Cl. ................................. 403/313; 403/309; 403/302; 403/356
[58] Field of Search ............... 403/313, 302, 309, 305, 403/356

[56] References Cited

U.S. PATENT DOCUMENTS

| | | | |
|---|---|---|---|
| 2,348,071 | 5/1944 | Johnstone | 403/305 |
| 3,554,589 | 1/1971 | Boggs | 403/356 X |
| 4,217,061 | 8/1980 | Eiland et al. | 403/313 |
| 4,848,951 | 7/1989 | Boogerman | 403/356 X |

Primary Examiner—Andrew V. Kundrat
Attorney, Agent, or Firm—Bernhard Kreten

[57] ABSTRACT

A method and resulting coupler for uniting two shafts to effect mutual rotation. The coupler especially accommodates two different shaft diameters and provides a longitudinally extending slit passing through an outer wall of the coupler to expedite shaft installation and removal. The method allows the coupler to be made of a single piece of material and assures proper alignment of the two coupled shafts. A groove, extending only partially into the outer wall, facilitates flexing of the coupler for shaft installation and removal. Keyways extend on an interior wall of the coupler, the formation of which is facilitated by an arcuate inner groove.

22 Claims, 1 Drawing Sheet

SHAFT COUPLING DEVICE

FIELD OF THE INVENTION

This invention relates to devices which couple two rotating shafts together transferring rotation from one shaft to the other and to methods for forming these devices. More specifically, this device is designed to rigidly couple shafts of different diameters by having inner bores of similar diameters to the diameters of the two coupled shafts. The device is machined from a single piece of material. A method of manufacture is employed which assures alignment of the shafts being coupled by forming much of the device at one setting without removal from the forming machine. Two keyways hold keys which resist shaft slippage within the inner bores of the device. An arcuate groove between the two keyways facilitates a method of keyway formation which significantly reduces tool damage. Various components of this device provide for easy attachment and detachment of the device from the two shafts.

BACKGROUND OF THE INVENTION

Devices for coupling rotating shafts together are well known in the art. Primarily, existing devices are designed to couple shafts of similar diameter or to connect a shaft to another type of mechanical device. Currently existing devices are unsatisfactory in that they are not easily adaptable for use in coupling shafts of different diameter and are not easily attachable or detachable after prolonged use. The applicants device is capable of rigidly and securely coupling shafts of separate diameters while still being easily detached from the shafts and reattached for later use.

The following patents reflect the state of the art of which applicant is aware and are included herewith to discharge applicant's acknowledged duty to disclose relevant prior art. It is stipulated, however, that none of these references teach signally nor render obvious when considered in any conceivable combination the nexus of the instant invention as disclosed in greater detail hereinafter and as particularly claimed.

| INVENTOR | PATENT NO. | ISSUE DATE |
| --- | --- | --- |
| White | 3,236,572 | Feb. 22, 1966 |
| Zugal | 3,844,137 | Oct. 29, 1974 |
| Zugal | 3,917,424 | Nov. 4, 1975 |
| Eiland et al. | 4,217,061 | Aug. 12, 1980 |
| Vella | 4,505,609 | Mar. 19, 1985 |
| Boogerman et al. | 4,848,951 | Jul. 18, 1989 |

The patent to Eiland teaches a shaft coupling with two separate tapered keys and a groove defining two separate collars for each shaft. The Eiland patent is only capable of attaching shafts of identical or nearly identical diameter. Furthermore, the Eiland patent is weakened by the placement of the groove between the two collars reducing its torque withstanding ability. The applicant's invention is capable of fastening shafts of entirely different shaft diameter with the axis of rotation of the two shafts being co-linear rather than offset as the Eiland patent would require. The applicant's invention is not disrupted by any grooves which circumscribe the circumference of an inner bore improving its torque withstanding capability.

The two patents to Zugal teach a shaft coupling device made of plural elements; a first element to fasten to a first shaft, a second element to fasten to a second shaft, and a third element to provide a flexible linkage between the first two elements. The Zugal patents attach a sleeve to each shaft which is composed of two distinct half-circular portions held together by complemental bolts and threaded holes. The Zugal patent is not designed to form a rigid coupling between the two shafts but rather is designed for flexible attachment of two shafts which are out of line. The applicant's device, being formed without grooves perpendicular to an axis of shaft rotation, is better able to withstand high torque loads.

The remainder of the prior art further diverge from the unique attributes of the applicant's invention.

SUMMARY OF THE INVENTION

The shaft coupling device of this application is of substantially cylindrical construction with a bore passing through its two flat ends. The device is designed primarily to couple shafts of different diameters and hence the bore has two portions of separate diameter. However, the device can be modified to couple shafts of similar diameter. The cylinder is split along one side forming a slit and bolts are provided which pass through both of the slit walls and through the outer surface above and below the slit. Once the shaft coupler has been placed on the shafts, the bolts may be tightened, thus reducing the diameter of the bore slightly and clamping the coupler to the shafts.

Two keyways are provided, one for each different bore diameter portion, which are capable of receiving a key which prevents slippage of the shafts within the bore. An arcuate groove extends radially into a side of the coupler from an inner surface of the inner bore, at the transition between the two separate inner bore diameters. The arcuate groove is cut to allow the keyway of the larger diameter bore to more easily and cost-effectively be formed along the inner wall. The arcuate groove also allows the keyway to be easily formed with a flat bottom parallel to the bore walls rather than with a sloping bottom. This allows a key to lay flat within the keyway. Screws with associated thread holes are provided which intersect an outer surface and the inner wall within the keyways preventing the keys from slipping out of the keyways.

A longitudinal groove is formed on the outer surface of the coupling to increase the flexibility of the coupling for being loosened and tightened with the bolts. A third threaded hole is formed between an inner wall of the slit and the outer surface which can receive a bolt. When a bolt is placed in this third hole and advanced the two surfaces of the slit are forced apart by the bolt thereby releasing the coupling from the shafts. The shaft coupling is formed from a single piece of material increasing its strength and rigidity and simplifying its construction.

The outer surface of the coupling is formed with smooth transitions between areas of separate outer diameters to avoid locations of stress concentration. The longitudinal groove is formed as a smoothly sloping groove of equal depth on opposite flat ends of the shaft coupling with a full radius curved bottom surface to avoid abrupt transitions which could otherwise be sights of initial crack formation.

The outer surface of the coupling is milled around the threaded holes which receive the bolts which clamp the coupling device around the shafts. This provides flat surfaces for the heads on the bolts to rest against an outer surface of the coupling. The two threaded holes which penetrate both sides of the slit are only threaded on lower portions opposite the milled ends of the holes. Upper portions adjacent to the milled ends are not threaded. This allows the bolts to effectively clamp the two sides of the slit together.

By forming the coupling to fit predetermined shaft diameters, the coupling is able to attach the two shafts without any off-set of the two shaft's axes of rotation. With in live axes of rotation, the shaft coupling and associated shafts are less prone to vibrational fatigue.

OBJECTS OF THE INVENTION

Accordingly, it is an object of this invention to provide a novel and useful device which can couple two shafts rotating together.

Another object of this invention is to provide a device which can couple shafts of different diameters together while keeping their axes of rotation co-linear.

A further object of this invention is to provide a device which is capable of adjusting to attach firmly around a shaft and avoid slippage when the shaft is rotated.

Another further object of this invention is to provide a shaft coupler which can support high torque loads.

Another further object of this invention is to provide a shaft coupler which is both easy and inexpensive to manufacture.

Another further object of this invention is to provide a shaft coupler which may be easily detached from the coupled shafts which are coupled even after prolonged attachment.

Viewed from a first vantage point, it is an object of this invention to provide a shaft coupling device comprised of a first sleeve portion with a hollow inner bore, a second sleeve portion on an opposite end with a different sized inner bore, and a means for attaching the first sleeve portion and the second sleeve portion respectively onto two shafts of different sizes.

Viewed from a second vantage point it is an object of this invention to provide a coupling to unite two shafts comprised of a unitary mass of material having a central bore, a keyway scribed in the inner wall of the bore, and a slit coextensive with the length of said mass of material.

Viewed from a third vantage point it is an object of this invention to provide a method for forming a coupler to unite plural shafts including steps of contouring an inner bore within a piece of material, scarifying an annular groove into a central area of the inner bore, and machining a keyway into the bore.

DESCRIPTION OF PREFERRED EMBODIMENTS

Figure 1:
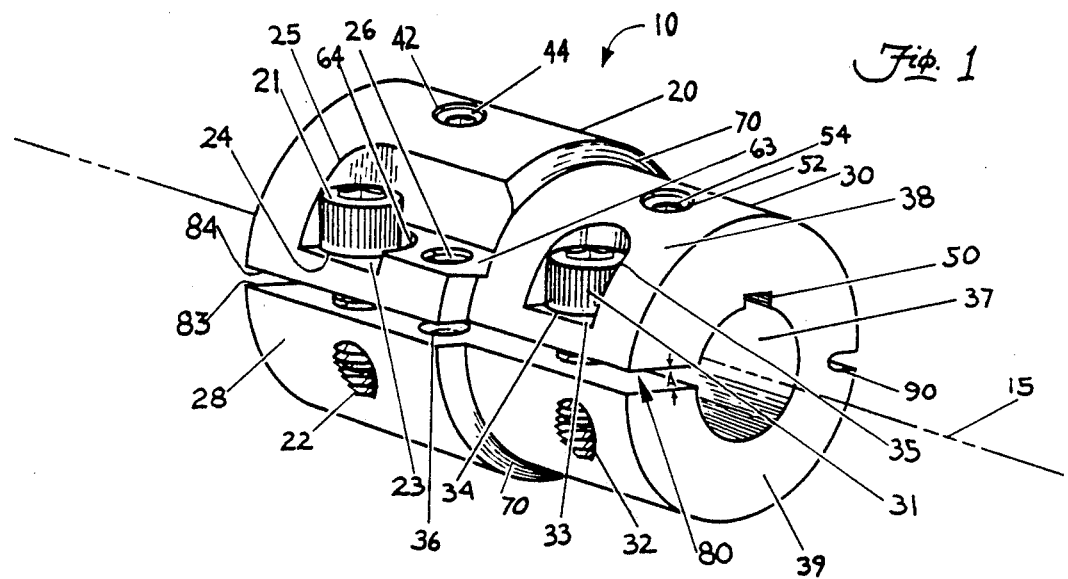
FIG. 1 is an isometric view of the device of this application.

Referring now to the drawings wherein like numerals represent like parts throughout, numeral 10 refers to the rotating shaft coupling device of the present invention.

In essence, the shaft coupling 10 includes a first large sleeve 20 adjacent to a first flat end 29 and a second small sleeve 30 adjacent to a second flat end 39. Each sleeve 20, 30 is a hollow cylindrical construct. A first keyway 40 is formed on an inner surface 27 of the first sleeve 20. A second keyway 50 is formed on an inner surface 37 of the second sleeve 30. Each keyway 40, 50 is intersected by a threaded hole 42, 52 which receives a screw 44, 54 capable of holding a key in place. Where the first inner surface 27 and second inner surface 37 come together on the interior of the shaft coupling 10 an arcuate groove 60 is formed. A slit 80 intersects a side wall of both the first sleeve 20 and the second sleeve 30 defining an upper slit surface 84 and a lower slit surface 83. The slit 80 is intersected perpendicularly by two sleeve holes 22, 32 which are threaded and capable of receiving two bolts 21, 31. A detachment threaded hole 26 intersects only the upper surface 84 of the slit 80 and is capable of receiving either of the bolts 21, 31. On the side opposite the slit 80 is formed a back groove 90 which only penetrates partway from the outer surfaces 28, 38 to the inner surfaces 27, 37.

Figure 3:
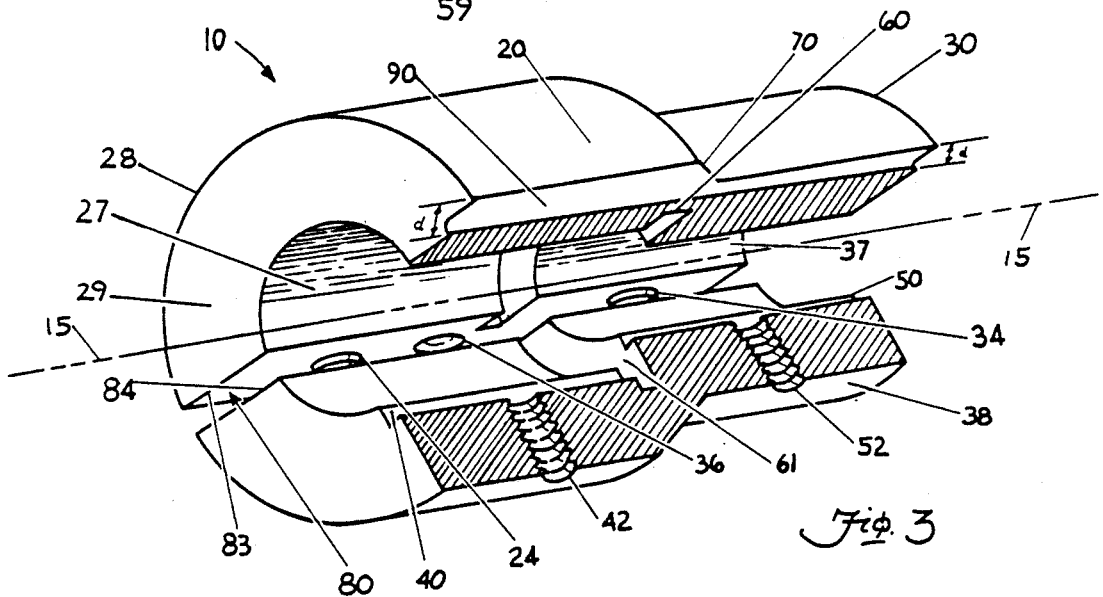
FIG. 3 is an isometric view of the device of this application with a cutaway revealing inner details.

More specifically, the shaft coupling 10 is preferably constructed from a single piece of material formed into two adjacent sleeves. A first larger sleeve 20, clearly shown in FIG. 3, is a substantially hollow cylindrical construct defined generally by an outer surface 28, an inner surface 27 and a flat end 29. A second smaller sleeve 30, clearly shown in FIG. 1, is a substantially hollow cylindrical construct defined generally by an outer surface 38, an inner surface 37 and a flat end 39. The inner surfaces 27, 37 are substantially cylindrical to conform with outer surfaces of the shafts they are sized to receive.

The two outer surfaces 28, 38 are connected together by a transition slope 70. The transition slope 70 is angled to avoid abrupt corners where stresses may accumulate to cause cracking. The transition slope 70 is essentially a frustum in shape with a greater diameter equal to the outer diameter of the first large sleeve 20 and a lesser diameter equal to the outer diameter of the second small sleeve 30.

Figure 2:
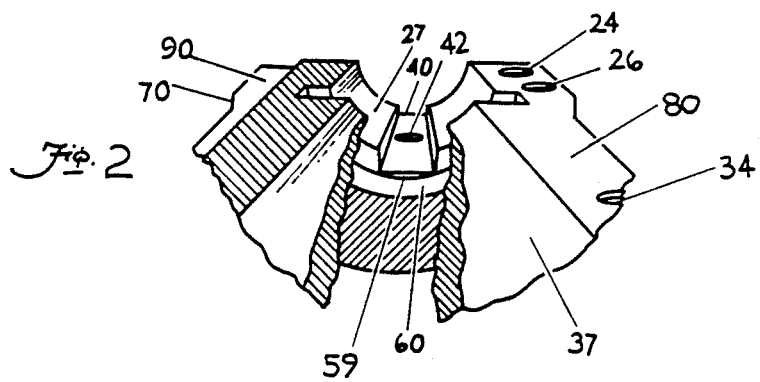
FIG. 2 is an isometric view of a portion of the device of this application with cut-aways revealing inner details.

Referring now to FIG. 2 and FIG. 3, the two inner surfaces 27, 37 come together at an arcuate groove 60. The arcuate groove 60 is a toroidal recess of substantially rectangular cross-section, but with radiused corners to prevent cracking. The groove 60 is formed between the inner surfaces 27, 37 in a plane parallel to the two flat ends 29, 39. The width of the arcuate groove 60 is wide enough to allow chips of material to escape while cutting, thus protecting the cutting tool. Keyway 40 extends into the groove 60. In this way, the keyway 40 can be formed subsequent to forming the arcuate groove 60 without causing undue stress to the cutting tool while forming the keyway 40 by removing in advance the innermost portion of the keyway 40. Without such a groove 60, the keyway 40 would likely not have a rectangular contour at its end near groove 60.

The keyway 40 is formed on the inner surface 27 of the first sleeve 20. The keyway 40 is a rectangular cross-section trough which extends longitudinally along the inner surface 27 and perpendicularly intersects the arcuate groove 60. A threaded hole 42 extends from outer surface 28 and into the keyway 40 orthogonal to the keyway 40. A key screw 44 fits within the threaded hole 42. When a key is within the keyway 40, the key screw 44 may be rotated forcing the key against a shaft with a complemental keyway (not shown) and thereby restrict the shaft from rotating (i.e. slipping) relative to the first sleeve 20.

A keyway 50, shown in FIG. 1 and FIG. 3, is formed on the inner surface 37 of the sleeve 30. The keyway 50 is a rectangular cross-section trough which extends longitudinally along the inner surface 37. A threaded hole 52 extends from the outer surface 38 and into the keyway 50 orthogonal to the keyway 50. A key screw 54 fits within the threaded hole 52. When a key is within the keyway 50, the key screw 54 may be rotated forcing the key against a shaft with a complemental keyway (not shown) and thereby restrict the shaft from rotating relative to the second sleeve 30.

The arcuate groove 60, shown in detail in FIG. 2, is preferably formed with a diameter making the groove 60 coextensive with outboard extremities of the keyway 40 taken parallel to the keyway's long axis. A slight step 59 exists between the keyway 40 and the arcuate groove 60 at the centerline of the keyway's long axis. This step 59 is created to allow the corners of the keyway 40 to be an equal distance from the axis of rotation 15 as the inner surface of the arcuate groove 60. The step 59 is a sector of a circle in shape. The sector is defined by an arc curving from corners of the keyway 40 along the inner surface of the arcuate groove 60 on one side and defined by a chord between the corners on another side.

In formation, the arcuate groove 60 is included at the transition between the inner surfaces 27, 37 of the shaft coupling 10. After the inner surfaces 27 and 37 are bored and the groove 60 is in place the keyway 40 is then formed. In this way, the tools used to create the keyway 40 are better able to create the square cornered keyway 40 without tool damage. The keyway 50, being formed within the second small sleeve 30 and being closer to a rotational axis 15, does not share the problem created in forming the first keyway 40 because the cutting tool does not have to encounter the face 61, shown in FIG. 3, which defines the step between bores 27 and 37.

Referring now to FIG. 1, a slit 80 bisects a sidewall of the shaft coupling 10 from the first flat end 29 to the second flat end 39 radially from an axis of rotation 15 of the shaft coupling 10. The slit 80 is defined by an upper surface 84 and a lower surface 83.

The first sleeve 20 has a threaded hole 22 which passes through the first outer surface 28 and the surface 83 of the slit 80. Hole 22 does not pass through to the inner surface bore 27 but rather extends like a chord on a circle. Threaded hole 22 registers with an upper unthreaded hole 24 which is between the first outer surface 28 and the upper surface 84 of the slit 80. The first outer surface 28 has a first sleeve recess 25 surrounding the unthreaded hole 24. Recess 25 includes a flat surface 23 parallel to the slit 80. The first sleeve recess 25 does not pass through to the inner surface bore 27.

A first sleeve bolt 21 fits within the unthreaded hole 24 and threads within the threaded hole 22. When the first sleeve bolt 21 is completely tightened within the first sleeve hole 22 a head of the first sleeve bolt 21 is directly adjacent the flat surface 23 of recess 25. By rotating the first sleeve bolt 21 the upper surface 84 and lower surface 83 of the slit 80 may be drawn together as per arrow "A".

The second sleeve 30 has a threaded hole 32 which passes through the second outer surface 38 and the lower surface 83 of the slit 80. Threaded hole 32 extends as a chord on a circle and does not intersect the inner surface bore 37. The second threaded sleeve hole 32 registers with an upper unthreaded hole portion 34 which passes through the upper surface 84 of the slit 80 and a sleeve recess 35 along with a recess shelf 33.

Like the first sleeve recess, the second sleeve recess 35 does not extend through to the inner surface bore 27. A second sleeve bolt 31 fits within the unthreaded hole 32 and threads with the second sleeve threaded hole 32. When the second sleeve bolt 31 is completely tightened, the second sleeve threaded hole 32 draws opposite surfaces 83 and 84 together, narrowing (or closing) slit 80.

A detachment threaded hole 26 is placed within recess 25, on a shelf 63 located between first sleeve bolt 21 and transition slope 70. The shelf 63 is raised from shelf 23. A transition border 64 extends therebetween. The detachment threaded hole 26 is of diameter similar to both the first sleeve threaded hole 22 and the second sleeve threaded hole 32 and capable of receiving either the first sleeve bolt 21 or the second sleeve bolt 31. When a bolt 21, 31 is tightened within the detachment threaded hole 26 the bolt 21, 31 presses against the lower surface 83 of the slit 80 within a concave recess 36 forcing the slit 80 to spread to an increased width. The concave recess 36 holds the bolt 21, 31 in line while widening the slit 80. In this way, the shaft coupling 10 may be easily detached (opposite arrow "A") from the two shafts even if the fit between the shafts and shaft coupling 10 is tight.

A back groove 90, shown in detail in FIG. 3, is formed on the first outer surface 28 and second outer surface 38 extending from the first flat end 29 to the second flat end 39 in a longitudinal direction and only partially bisecting the sidewall of the shaft coupling 10. Preferably the back groove 90 is located 180° from the slit 80. The back groove 90 is preferably of equal depth "d" on the first flat end 29 as it is on the second flat end 39 and therefore slopes from a location of greater distance from the axis of rotation 15 at the first flat end 29 to a location of lesser distance from the axis of rotation 15 at the second flat end 39. The bottom surface of the groove 90 is a full radius to help prevent cracking. The back groove 90 allows the slit 80 to be deflected to greater and lesser widths more easily through action of the bolts 21, 31 within the sleeve holes 22, 32 or within the detachment hole 26.

In use and operation the shaft coupling 10 is chosen to have inner surfaces 27, 37 of a diameter equal to the shafts to be coupled. The shafts are formed with keyways complemental to the keyways 40, 50 of the shaft coupling 10. The shafts, with a key for each shaft in place, are then inserted into the first flat end 29 and second flat end 39 of the coupling 10 with the shaft keyways in line with the keyways 40, 50 of the shaft coupling 10. The keys fit into the resulting keyways and the two sleeve bolts 21 and 31 are tightened, then the key screws 44, 54 are tightened holding the keys in place. This assures a tight fit and proper alignment. The shaft coupling 10 is now ready to transfer rotation from an input shaft to an output shaft. Later, when the shaft coupling 10 is to be removed from the shaft, the bolts 21, 31 are loosened and one of the bolts 21, 31 is placed within the detachment threaded hole 26 and tightened. This forces the slit 80 to widen loosening the shaft coupling 10 from the shafts. The key screws 44, 54 may be loosened and the shafts may be easily removed from the shaft coupling 10. The shaft coupling 10 may then be reused with other similar diameter shafts.

A preferred method for forming the coupling 10 from one piece of material includes optionally cutting stock material to length, rough core boring large and small bores, rough boring the large and small bores, cut the arcuate groove 60, finishing large and small bores, facing the larger bore's end wall 29 and outer periphery, then cutting the larger bore's keyway 40 with a series of passes extending into the arcuate groove 60. This assures the alignment of axes of the two shafts while rotating. The part is then turned end for end (rotated 180°) and the other end is faced on end 39 and the outer periphery. The keyway 50 is then cut in the small bore. Finally recesses 25,35 and surfaces 25,35,63 are milled, holes 22,24,32,34,42, 52,26 are drilled, holes 22,32,42,52,26 are then appropriately tapped.

Moreover, having thus described the invention, it should be apparent that numerous structural modifications and adaptations may be resorted to without departing from the scope and fair meaning of the instant invention as set forth hereinabove and as described hereinbelow by the claims.

We claim:

1. A method for forming a coupler to unite plural shafts the steps including:
   contouring an inner bore of the coupler complemental to the exterior cross-sectional diameters of the shafts to be coupled, p1 forming keyway machining tool clearance into a central area of the bore adjacent an area of conjunction of the shafts, and, machining a keyway into said bore.

2. The method of forming the coupler of claim 1 the steps also including:
   slitting the coupler longitudinally from an inner wall defining the central bore to an outer surface such that a slit extends radially from the coupler,
   drilling a plurality of holes to pass from the outer surface, through two surfaces defining the slit and back through the outer surface without penetrating the central bore,
   threading one portion of said holes to receive a bolt capable of narrowing the slit when the bolt is rotated, and
   milling a flat surface orthogonal to the holes on the outer surface of the coupler on another portion of said holes to provide a shelf upon which a head of the bolt resides.

3. The method of forming the coupler of claim 2 the steps also including:
   drilling a hole to pass from the outer surface through only one surface of the slit,
   threading the hole to receive a bolt capable of widening the slit when the bolt is rotated by contacting a surface of the slit opposite the drilled hole, and
   partially grooving another outer wall of the coupler longitudinally to facilitate peripheral spreading and clamping of the coupler.

4. A shaft coupling device for rigidly connecting two shafts for mutual rotation comprising, in combination:
   a first sleeve portion with a hollow inner bore,
   a second sleeve portion juxtaposed with said first sleeve portion and having a different size hollow inner bore than said hollow inner bore of said first sleeve portion, and
   a means for attaching both said first sleeve portion and said second sleeve portion of said coupling device onto a first shaft of one size complemental to said first sleeve bore and onto a second shaft of another size complemental to said second sleeve bore;
   whereby two rotating shafts of distinct sizes may be rigidly coupled together;
   and wherein said inner bore of said first sleeve has a keyway formed in an inner surface of said inner bore and said inner bore of said second sleeve has a separate keyway formed in an inner surface of said inner bore;
   and wherein said keyways are rectangular cross-section channels of constant depth which run from a first end and a second end longitudinally along the entirety of said first sleeve portion and second sleeve portion,
   whereby keys of complemental shape to said keyways may fit within said keyways and also within two similar keyways formed in the shafts restricting the shafts and said first sleeve and said second sleeve from rotation relative to each other;
   and wherein the keys are held in place by a plurality of key screws which fit within threaded keyway holes which extend radially through said first sleeve and said second sleeve from an outer surface to within said keyways,
   whereby when the keys are in place within said keyways said key screws will contact said keys with a tip thereof, thereby preventing the keys from moving longitudinally.

5. The coupling device of claim 4 wherein said means for attaching said coupling device to the two shafts is a slit completely bisecting one side of said first sleeve and said second sleeve and a clamping means, whereby said inner bore of said first sleeve and said inner bore of said second sleeve may be formed slightly larger than the shafts and then be constricted by said clamping means to grasp the shafts.

6. The coupling device of claim 5 wherein said clamping means is a plurality of threaded bolt holes with complement bolts formed in said first sleeve and said second sleeve which begin on a top side of said slit and end on a bottom side of said slit, whereby when rotation is applied to said bolts within said threaded holes, said slit is reduced in width and the shafts are grasped.

7. The coupling device of claim 6 wherein a groove is formed on said first sleeve and said second sleeve on said outer surface which extends radially only part way to said inner surface of said first sleeve and said inner surface of said second sleeve and which extends longitudinally from said first end to said second end, whereby said coupling may exhibit added flexibility.

8. The coupling device of claim 7 wherein a threaded detachment hole is formed passing through a portion of said coupling device and facing said slit, whereby one said bolt may be placed within said detachment hole and rotated causing said slit to increase in width due to said bolt's impact against a wall of said slit opposite said detachment hole, allowing said coupling device to be detached from the shafts.

9. The coupling device of claim 8 wherein a transition angle is formed on said outer surface of said coupling device between said first sleeve and said second sleeve which tapers from an outer diameter of said first sleeve to an outer diameter of said second sleeve, whereby abrupt transitions are avoided improving stress withstanding properties of said coupling device.

10. The device of claim 9 wherein said groove penetrates said first sleeve at said first end an equal distance as said groove penetrates said second sleeve at said second end, and wherein said groove tapers at a continuous rate from said first end to said second end;

whereby said coupling device is shaped without abrupt contours for better stress-withstanding characteristics.

11. A coupling to unite two shafts comprising in combination:
   a unitary mass of material having a central bore defining an inner wall, a keyway described in said inner wall of said bore, one longitudinal portion of said mass provided with a slit coextensive with a length of said mass of material;
   and wherein two opposing sides of said slit are held at adjustable relative spacing by a plurality of bolts residing within a plurality of threaded holes intersecting said opposing sides of said slit, whereby when said bolts are rotated, said slit is reduced in width;
   and wherein a detachment hole is formed by orienting a threaded hole in one side of said opposing sides of said slit which receives a bolt, whereby when one said bolt is rotated said bolt impacts another side of said opposing sides, the width of said slit is increased.

12. The coupling of claim 11 wherein a groove is formed on an outer surface of said unitary mass which extends radially part way from said outer surface to said inner surface.

13. The coupling of claim 12 wherein said central bore is of a different diameter on opposite ends of said unitary mass, and two separate keyways are provided, one for each bore diameter within said unitary mass, with an abrupt transition in a middle of said unitary mass coincident with juxtaposition of the two shafts, whereby two shafts of different diameter may be rigidly coupled together.

14. The coupling of claim 13 wherein an arcuate groove extends radially outwardly from said inner surface toward said outer surface at said abrupt transition to a depth similar to the depth of said keyway, whereby said keyway may be formed on an inner wall of said bore's greater diameter portion without injuring matching tools or said coupling itself during manufacture and providing a trued keyway.

15. The coupling of claim 14 wherein said keyways are rectangular channels with a plurality of screws residing in a plurality of threaded holes formed between said outer surface and said inner surface within said keyways, whereby keys may be held in place within said keyways by tightening said screws against the keys.

16. A shaft coupling device for rigidly connecting two shafts for mutual rotation comprising, in combination:
   a first sleeve portion with a hollow inner bore,
   a second sleeve portion juxtaposed with said first sleeve portion and having a different sized smaller hollow inner bore than said hollow inner bore of said first sleeve portion, and
   a means for attaching both said first sleeve portion and said second sleeve portion of said coupling device onto a first shaft of one size complemental to said first sleeve bore and onto a second shaft of another size complemental to said second sleeve bore;
   whereby two rotating shafts of distinct sizes may be rigidly coupled together;
   and wherein said inner bore of said first sleeve has a first keyway formed in an inner surface of said inner bore and said inner bore of said second sleeve has a separate second keyway formed in an inner surface of said inner bore;
   and wherein a tool stress relieving groove is provided near a transition between said keyways, said groove having a width greater than the width of said first keyway and said groove having a depth greater than the depth of said first keyway;
   whereby said first keyway may be completely machined with a tool without causing damage to the tool at said transition with said groove due to tool impact against said second sleeve having said smaller hollow inner bore of a lesser diameter.

17. The device of claim 16 wherein said groove is arcuate and extends radially outwardly from said inner surface toward said outer surface at said transition, to a depth slightly greater than the depth of said keyway of said first sleeve which has said inner bore of a greater diameter.

18. A coupling to unite two shafts comprising in combination:
   a unitary mass of material having a central bore defining an inner wall,
   a keyway scribed in said inner wall of said bore, and one longitudinal portion of said mass provided with a slit coextensive with a length of said mass of material;
   and wherein a tool stress relieving groove is provided near a transition between a greater diameter portion of said keyway and a lesser diameter portion of said keyway, said groove having a depth greater than the depth of a deepest said keyway, and said groove having a width greater than the width of said deepest keyway;
   whereby the deepest of said keyways may be completely machined using a tool without causing damage to the tool at said transition due to tool impact against a portion of said unitary mass which has a lesser diameter.

19. The device of claim 18 wherein said groove is an arcuate groove which extends radially outwardly from said inner wall toward an outer surface at said transition, to a depth slightly greater than the depth of said keyway of said greater diameter portion of said inner bore.

20. A machined mass for coupling a first shaft with a first diameter with a second shaft having a second diameter, thereby allowing rotation substantially about a common axis, comprising in combination:
   a sleeve having a first inner bore on a first end of said sleeve, said first bore of a diameter equal to the first shaft's diameter, and a second inner bore on a second end of said sleeve, said second bore of a diameter equal to the second shaft's diameter, said first inner bore of a greater diameter, than said second inner bore,
   a first bore keyway sized to receive a first key connectable to the first shaft, and a second bore keyway sized to receive a second key connectable to the second shaft, allowing each shaft to be restricted from rotation relative to said sleeve and hence relative to each other, and
   a machining tool stress relieving gap, located near a transition between said keyways of said first inner bore and said second inner bore, sized of a width greater than the width of said first bore keyway and of a depth greater than the depth of said first bore keyway, allowing said first bore keyway to be completely machined using a machining tool without causing damage to the tool at said transition due to tool impact against said sleeve where said first bore of a greater diameter changes to said second bore of a lesser diameter.

21. The machined mass of claim 20 wherein said gap is an arcuate groove which extends radially outwardly from an inner surface of said first inner bore at said transition toward an outer surface of said sleeve, to a depth slightly greater than the depth of said first bore keyway of said sleeve.

22. A method for forming a coupler to unite plural shafts of different diameters the steps including:
   contouring an inner bore of the coupler complemental to the exterior cross-sectional diameters of the shafts to be coupled,
   forming keyway machining tool clearance on the inner wall of the inner bore at a transition between the larger shaft bore and the smaller shaft bore,
   machining a keyway into said bore which intersects at the transition between the larger shaft bore and the smaller shaft bore.

* * * * *